(12) United States Patent
McPolin (10) Patent No.: US 7,233,946 B1
(45) Date of Patent: Jun. 19, 2007

(54) FILE INTERVAL LOCK GENERATION INTERFACE SYSTEM AND METHOD

(75) Inventor: Steve McPolin, Nepean (CA)

(73) Assignee: Sun Microsystems, Inc., Santa Clara, CA (US)

( * ) Notice: Subject to any disclaimer, the term of this patent is extended or adjusted under 35 U.S.C. 154(b) by 668 days.

(21) Appl. No.: 10/412,152

(22) Filed: Apr. 11, 2003

(51) Int. Cl.
*G06F 17/30* (2006.01)

(52) U.S. Cl. .......................................... 707/8
(58) Field of Classification Search .................. 707/1, 707/2, 9, 10, 200, 8; 709/224
See application file for complete search history.

(56) References Cited

U.S. PATENT DOCUMENTS 5,946,685 A * 8/1999 Cramer et al. ................. 707/10

OTHER PUBLICATIONS

David Lomet: Key Range Locking Strategies for Improved Concurrency, Feb. 10, 1993, Cambridge Research Laboratory, Technical Report Series.*

* cited by examiner

*Primary Examiner*—Etienne P. LeRoux
(74) *Attorney, Agent, or Firm*—Martine Penilla & Gencarella, LLP (57) ABSTRACT

A computer system having a kernel interface that provides a file lock generation system for generating file interval locks and granting simultaneous access to these locks to application programs requesting access to file objects or portions thereof and provides a common interface to operations upon those objects. An interval is a starting location and length and the locking mechanism grants access to non-overlapping intervals independently.

10 Claims, 6 Drawing Sheets

FILE INTERVAL LOCK GENERATION INTERFACE SYSTEM AND METHOD

CROSS REFERENCE TO RELATED APPLICATION

This application is related to Steve McPolin, co-filed U.S. patent application Ser. No. 10/412,147, filed on Apr. 11, 2003, titled "A FILE SYSTEM VIRTUAL MEMORY DESCRIPTOR GENERATION INTERFACE SYSTEM AND METHOD". To the extent not repeated herein, the contents of this patent application are hereby incorporated herein by reference.

FIELD OF THE INVENTION

The present claimed invention relates generally to the field of computer operating systems. More particularly, embodiments of the present claimed invention relate to a system for providing an operating system kernel interface for generating file interval locks to file objects.

BACKGROUND ART

A computer system can be generally divided into four components: the hardware, the operating system, the application programs and the users. The hardware (central processing unit (CPU), memory and input/output (I/O) devices) provides the basic computing resources. The application programs (database systems, games business programs (database systems, etc.) define the ways in which these resources are used to solve the computing problems of the users. The operating system controls and coordinates the use of the hardware among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a simple time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

Unix consists of two separable parts: the "kernel" and the "system programs." Systems programs consist of system libraries, compilers, interpreters, shells and other such programs which provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides the file system, CPU scheduling, memory management and other operating-system functions by responding to "system-calls." Conceptually, the kernel is situated between the hardware and the users. System calls are the means for the programmer to communicate with the kernel.

Figure 1:
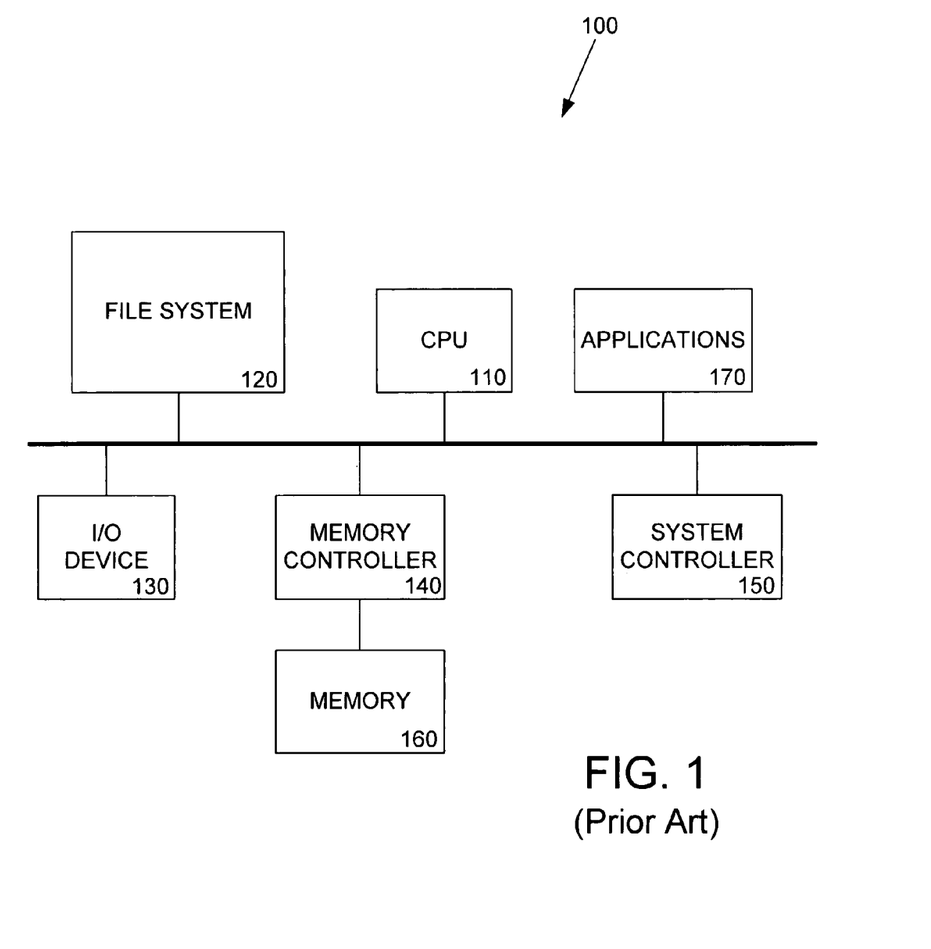
FIG. 1 is a block diagram of a prior art computer system.

FIG. 1 is a block diagram illustration of a prior art computer system 100 having a processor 110, file-system 120, memory 130, operating system 140, kernel 150, applications 160 and I/O devices 170. The prior art system 100 shown in FIG. 1 employs an access mechanism in which one or more applications may be initiating access to the same file objects in file system 120.

The prior art system 100 implements a shared resource environment which allows such system resources as memory 130 and file-system 120 to be shared between applications processes in applications 160. The kernel 150 includes interfaces that allows applications processes to access virtual memory in memory 130.

In the system 100 shown in FIG. 1, the kernel interface has limitations in its capabilities in supporting multiple and varied applications that access the file-system 120 despite the shared environment of system 100. This is because new file-system technologies have limited applicability due to the difficulty in adapting others to accommodate them. For example, multiple page size support in the virtual memory system in system 100 is not supported in a UFS file-system or other file-systems. On-line backups via snapshots cannot handle the files which have locked pages.

The difficulties with current kernel interfaces is primarily due to their shared state. File-systems must implement knowledge about the virtual memory system in order to operate correctly. This knowledge is vague and dynamic with respect to a source base. The corresponding difficulty lies within the virtual memory system, in that it can only assume generic file-system behavior; file-systems typically have no way to indicate it can utilize a new behavior.

As distributed systems become prevalent, it is important that the number of system downtimes be substantially reduced. CPU and network speeds, RAM and disk sizes will increase and so will access to these devices. The interface between the file-system 120 and memory 130 implementation therefore becomes important.

The file system 120 represents a logical grouping of files at a mount point in the computer system 100. It is represented to users as a top-level entry in the file system table. Within the file system 120 are file objects, which correspond to individual files or directories contained within the file system 120. A file object provides basic information about the object, such as name and parent, and what operations can be performed on it, such as moving, deleting and so on.

Multiple access to the same file objects or portions thereof in the file system 120 often result in conflict situation where one or more sequential activities may attempt to access the same state of an object in contradictory ways. This may result in a invalid state of the object being accessed unless various sequential activities which share access to the object implement a protocol to prevent an access sequence from being interleaved or occurring simultaneously. Such a prior art protocol is otherwise called a synchronization protocol and objects sought by two or more such activities are often called critical resources. By obtaining access permission to a critical resource according to a synchronization protocol, a sequential activity is said to enter a critical section.

There are a number of well-known synchronization protocols or mechanism. One of the most common is known as a "mutex" (mutual exclusion). A mutex is a data object which encapsulates a list of activities waiting for permission to access a critical resource. A synchronization protocol such as mutex is monolithic by monolithic locks which restricts access to entire set of items in the object. While such locks ease the implementation of an arbitrator of such items (for example, file system 120) they unnecessarily limit parallel access to such items.

Limiting parallel access results in lower object utilization than would otherwise be obtainable. An operation upon a set of items may be required to wait for a slow device to transfer data. During that waiting time, other items with the object in the file system 120 may be immediately accessible, but any accessors would be inhibited until the first operation is completed.

Having a monolithic locking mechanism is inefficient as it blindly serializes all accesses to file objects whether such access are read or write access. Serializing access to critical resources as implemented in the exclusionary locking mechanism of the prior art also creates bottlenecks in the file system when several access requests are made to one or two objects. This unnecessarily leads to system degradation. Thus, it is desirable to provide a controlled access to file objects which could reduce overhead carried in the inefficient serialization of current access protocols.

SUMMARY OF INVENTION

Accordingly, to take advantage of the myriad of distributed computer system and associated file systems available and the increasing number of new applications being developed for these distributed systems, a system is needed that has capabilities to allow an application to access files without having to exclusively restrict access to these files by other applications in a computer system. Further, a need exists for solutions to allow the development of a file interface system that may be implemented by a host application programs without requiring each iteration of the application programs to execute or generate its own independent file lock interface. A need further exists for an improved and less costly program independent operating system, which improves efficiency and provide a means to compile programs without losing the embedded features designed in these programs.

What is described herein is a computer system having a kernel interface that provides a file lock generation system for generating file locks and granting access to these locks to application programs requesting access to file objects and provides a common interface to operations upon those objects. Embodiments of the present invention allow programmers to create a kernel interface that provides a mechanism to achieve a cohesive de-coupled interface between file-systems and virtual memory in a distributed computer system. Embodiments of the present invention allows the kernel interface to be provided as four sub-components with a primary abstraction mechanism and three supporting mechanisms. The primary abstraction is a memory descriptor that presents a common interface to manifold memory objects. The set of supported objects includes the file lock generation system, a file base storage system and a VNODE operations system. The file lock generation system provides a lock around file system operations. The file lock generation system permits one writer or several readers to operate on a VNODE concurrently. The file lock generation system further provides a mechanism for file systems to have greater concurrency by providing a range of locks so that writers and readers to non-overlapping extents of a file may proceed concurrently.

Embodiments of the present invention include a generic file information extraction logic that provides constructive functions an application program requires to create file locks. The generic file lock information extraction logic also provides constructors for each underlying type of lock generated.

Embodiments of the file lock generation system of the present invention also include a range of lock that are defined in a set. In such a set, active range locks cannot overlap if they are not both shared accesses to a file object.

Embodiments of the file lock generation system of the present invention include allocation logic that allocates locks to requesting applications on several different types of file representations in the computer system. The allocation logic provides a mechanism of synchronizing a set of related locks across a file system.

Embodiments of the file lock generation interface further include shared lock generation logic for generating locks that may be shared by one or more files to specified offsets of a file object. The shared logic generation logic generates the shared locks by examining outstanding locks that have been granted by the file lock generation system against objects in the file system.

Embodiments of the file lock generation interface further include exclusive lock generation logic for generating and granting exclusive locks to files to specified offsets of file objects in a file-system. The exclusive lock generation logic prevents readers and writers from overlapping extents of a file. Any exclusive access range lock must be disjoint to every other active lock.

Embodiments of the file generation interface further include lock observation logic that provides a mechanism for monitoring the use patterns of files in the file system by programs requesting access to these files and adapts the performance of the files. The lock observation logic implements a couple of protocols for ensuring the performance of the locks to the designated file objects being accessed.

Embodiments of the file generation interface further include release lock module logic that removes the specific lock designations on objects after a requesting program has completed a file access operation on the object. The release lock logic examines the use patterns of locks and selects appropriate methods of relinquishing access to the locks.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method for providing a file-system virtual memory interface and memory descriptor generation system in a computer system that may be applicable to operating system kernels. In accordance with an aspect of the invention, a the memory descriptor generation system generated memory descriptor that manage a plurality of memory objects without having each of such objects independently generating a plurality of memory descriptor for each instantiation of applications that run in the computer system.

Figure 2:
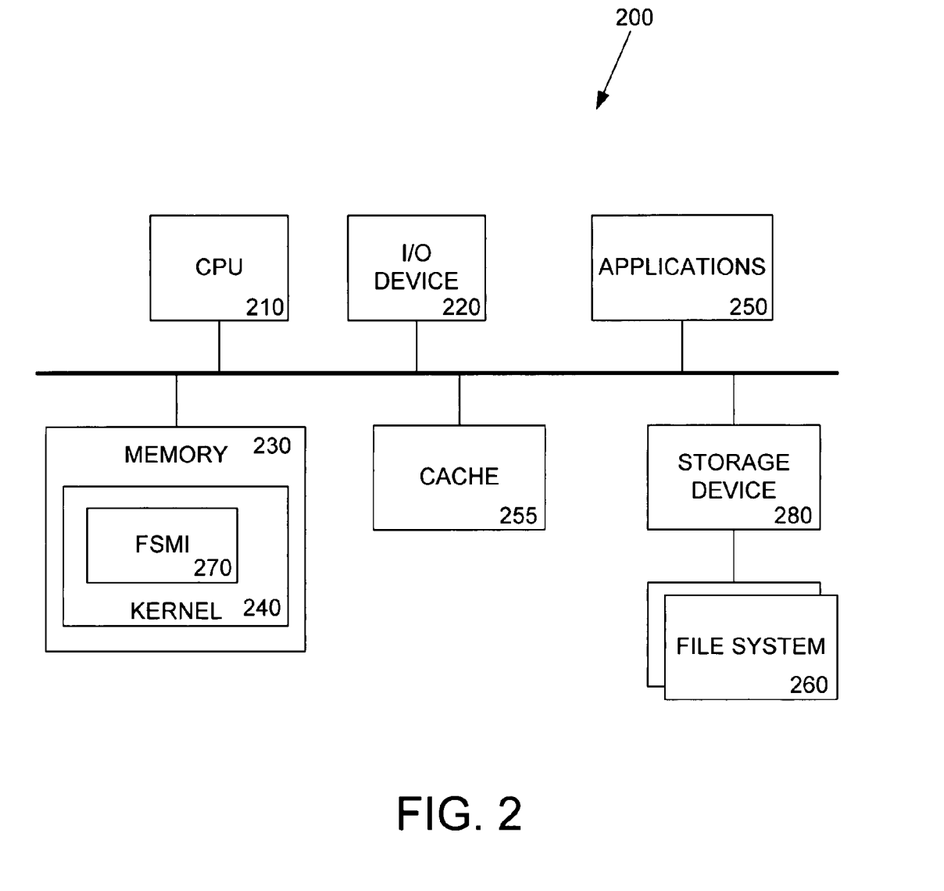
FIG. 2 is a block diagram illustration of a computer system in accordance with the present invention.

FIG. 2 is a block diagram illustration of one embodiment of a computer system 200 of the present invention. The computer system 200 according to the present invention is connected to an external storage device 280 and to an external drive device 220 through which computer programs according to the present invention can be loaded into computer system 200. External storage device 280 and external drive 220 are connected to the computer system 200 through respective bus lines. Computer system 200 further includes main memory 230, processor 210, file-system 260, application 250, cache 255 and descriptor generation system 270. Drive 220 can be a computer program product reader such a floppy disk drive, an optical scanner, a CD-ROM device, etc.

FIG. 2 additionally shows memory 230 including a kernel level memory 240. Memory 230 can be virtual memory which is mapped onto physical memory including RAM or a hard drive, for example, without limitation. During process execution, a programmer programs data structures in the memory at the kernel level memory 240. According to the present invention, the file system interface system 270 enables innovation in file and virtual memory systems.

The memory descriptor generated provides a single mechanism of representing memory objects and provides a common interface to operations upon those objects. In one embodiment of the present invention, two types of memory descriptors may be generated: a basic descriptor that manages memory objects and derived descriptors that manage other memory descriptors. In one embodiment of the present invention, only one level of derivation is supported and subsequent derivations are constructed relative to the underlying basic descriptor.

Each memory object in memory 230 has two primary components: the underlying memory itself and its mapping structures. The memory descriptor grants access to the underlying memory by providing a pointer to some sub-range of the object. In one embodiment of the present invention, the memory descriptor has a collection of attributes which guide it's behavior: these attributes are associated with a pool from which the memory descriptor is allocated. In one embodiment of the present invention each memory descriptor logically comprises type information, data, an offset, length information, a reference information and the pool from which the descriptor is allocated.

Figure 3:
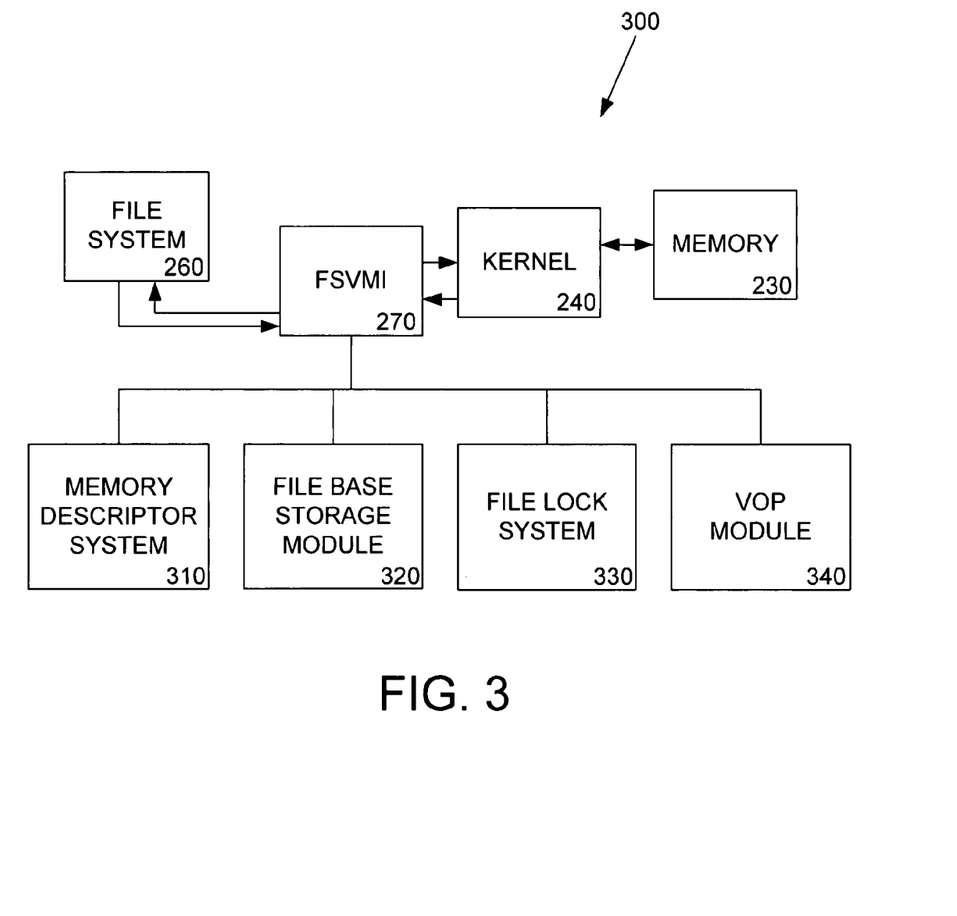
FIG. 3 is a block diagram of one embodiment of a file system interface of an embodiment of the present invention.

FIG. 3 is a block diagram illustration of one embodiment of the file system interface 270 in a file interval lock environment 300 of the present invention. The file lock environment 300 comprises file-system 260, file system interface (FSI) 270, kernel 240 and memory 230. The file system interface 270 comprises four sub-components made up of memory descriptor generation module 310, file base storage module 320, file interval lock interface module 330 and VNODE interface module 340.

The file-system 260 represents a file as an unaligned, directly addressable sequence of bytes. Within file system 260 are file objects which correspond to individual files or directories contained with the file system 260. A file object provides basic information about the object, such as name and parent, and what operations can be performed on the object, such as moving, deleting and so on. In one embodiment of the present invention, a file is stored in a sequence of fixed sized blocks and a translation which maps (e.g., file, offset) into a dive, block-number (block#), byte offset within a block. The device may be implemented as a network of storage devices which provide secondary mapping of device block# into read-drive, real block# information. This is implemented beneath the device interface to support existing file-systems. The means of communicating with this device is primarily the buffer structure (buf structure).

The buf structure encodes many parameters, including the device identifiers, block number significant to that device, number of bytes to transfer, a set of memory specifications and a description of what to do once the I/O is complete. The buf structure is supported by a set of routines which form the buffer cache. The buffer cache provides synchronous routines to acquire buffers, and a small set of synchronous or asynchronous routes to update the corresponding storage device.

In one embodiment of the present invention, the file base storage module 420 provides data transfer between memory descriptor and a storage object is implemented to map descriptors to corresponding memory ranges. An instance of the storage object is identified by vector of operations and a private data pointer. I/O operations are implemented asynchronous for read and write operations invoking a caller supplied notification when a descriptor generation is complete.

The file base storage module 320 provides a mechanism for the file-system 260 to initiate data transfer using memory descriptors. This completes the requirements that the file system 260 only deal with one type of memory; the descriptor. The file base storage module 320 also separates the file-system 260 code from the device; the file-system 260 need only deal with an instance of an abstractor class of the memory descriptor.

The file-system 260 interfaces with the kernel 240 via FSI 270. The FSI 270 is used by files in the file-system 260 implementations to provide an object oriented replacement for VNODES. The interface 270 co-exists with VNODE and VNODE-based operating systems in the operating system of the kernel 240 while fixing the key problems of VNODES. In one embodiment of the present invention, the FSI 270 is provided with four sub-components comprising a primary abstraction 310 component and three sub-components 320–340 needed to support the primary abstraction component 310. In one embodiment of the present invention, the primary abstraction 310 component is a memory descriptor in memory 230. The memory descriptor provides a common interface to manifold memory objects in memory 230. The set of supported objects is complete to the extent that the file-system 260 does not deal with any other representation of memory.

In one embodiment of the present invention, support of the memory descriptor requires re-factoring of the existing VNODE interface in the kernel 240. For example, the operations which deal with transferring pages or initially mapping do not make sense to a file-system 260 that is immune to these concepts.

In one embodiment of the present invention, one of the sub-components of the FSI 270 provides an implementation of VNODE operations in VNODE module 340 that is to be shared by all file-systems 260 in the computer system 200. In addition to maintaining the consistency of existing memory descriptors, the VNODE module 340 converts the VNODE operations (VOPS) into simple uncached operations.

Furthermore, in one embodiment of the present invention, file-system 360 transfers data between memory 230 and storage devices 280 in the computer system 200 via a buffer data structure and a set of associated functions. The buf structure exposes various virtual memory data structures and requires fields to be appropriately initialized with them. To immunize the file-system 260, an abstract data transfer mechanism may be used. The abstract data transfer mechanism is based on memory descriptors using device independent naming.

The file interval lock interface module 330 provides a coarse lock around file system operations and synchronizes access to files in the file system 260. The file interval lock interface module 330 can hold a lock for a user to perform concurrent read or write access to a file. In one embodiment of the present invention, the file interval lock interface module 330 permits one writer or several readers to operate on a VNODE concurrently. The file interval lock interface module 330 provides interval locks to permit simultaneous access to portions of an object.

An interval is a starting location and length of the object and the file interval lock interface module 330 grants access to non-overlapping intervals independently. Overlapping intervals are subject to the prescribed locking protocol (i.e., shared or exclusive). In one embodiment of the present invention, the interval locking protocol is applicable to areas where the object may be viewed as a vector of independent entities. Some examples include the address space of a process or the contents of a file.

The file interval lock interface system 330 further permits file system 260 greater concurrency by providing range locks so that writers and readers to non-overlapping extents of a file may proceed concurrently. In one embodiment of the present invention, the range locks are members of a set. The file interval lock interface module 330 further provides file locks that are adaptable to locking granularities enforced by a particular file system. The locks provide a guarantee that the range file is access controlled before entry into the file system operation.

Figure 4:
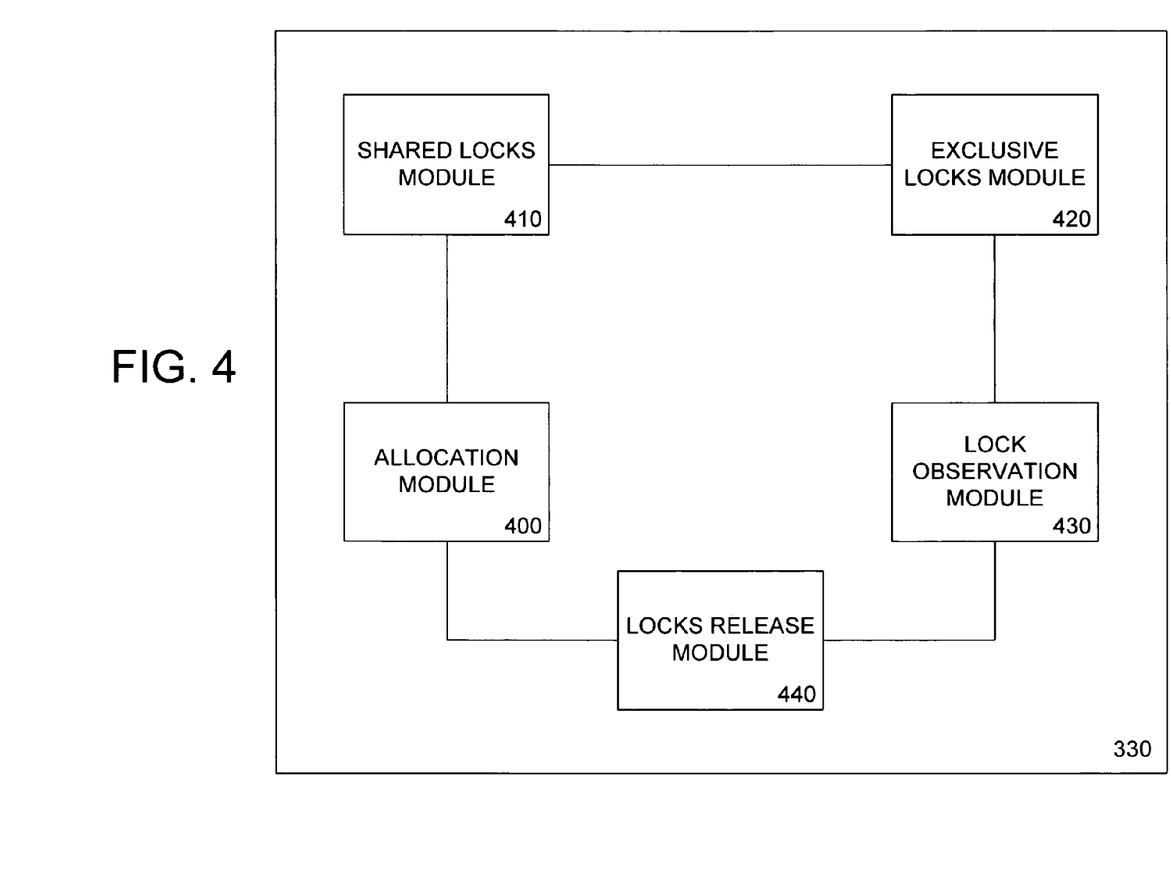
FIG. 4 is a block diagram of one embodiment of a file system file interval locking scheme of one embodiment of the present invention.

FIG. 4 is a block diagram of one embodiment of the internal architecture of the file interval lock interface system 330 of one embodiment of the present invention. As shown in FIG. 4, the file interval lock system 330 comprises lock allocation module 400, shared lock module 410, exclusive locks module 420, lock observation module 430, and lock release module 440.

The lock allocation module 410 provides synchronization across a span of a set of related locks. In one embodiment of the present invention, spans of locks are specified within a key value for a span lock request that specifies the desired span. Two spans which overlap are intersecting or otherwise they are disjointed. Intersecting locks have overlapping spans and independent locks have disjoint spans. In one embodiment of the present invention, the lock allocation module 510 uses as parameters the set of related span locks, the bits specifying locking protocol, the specified desired span and an update to point to actual keys used to create locks to allocate locks to files in the file system 260.

The shared lock module 410 provides a mechanism for generating locks by taking a look at outstanding locks that have been granted against the object in a file in the file system 260 been locked. The shared lock module 410 determines if each specified lock does affect others because they are all extent (i.e., a vector with a beginning and an end offset). If there is not intersecting locks, a lock may be granted. If a lock is shared, the lock can be granted. If a lock is exclusive, it is not granted to other programs until the lock is released.

The exclusive locks module 420 also provides a mechanism for generating locks to programs requesting file access in the file system 260. If the exclusive lock module 420 determines that a file or a portion thereof is requested for exclusive access, it grants a lock to the requesting program and prevents subsequent request to the same file or file portion to other programs. The exclusive lock module 420 holds the lock exclusive until the original program holding the exclusivity explicitly releases the lock (i.e., completes the operation on the file).

The lock observation module 430 provides a mechanism for monitoring the use patterns of files in the file system 260 by programs requesting access to these files and adapts the performance of the files. In one embodiment of the present invention, the lock observation module 430 implements a couple of protocols. In one such protocol, the lock observation module 430 starts off where there is contention on a lock by granting a very wide access to the lock and as contention builds, the lock observation module 430 narrows down what the actual extent of grant to the lock will be. The lock observation module 430 adapts itself to the demands that programs may make to objects in the file system 260.

The release lock module 440 removes the specific lock designation on objects after the requesting program has completed a file access operation on the object. The release lock module 440 examines the use patterns of locks and selects appropriate methods of granting trade off between the time taken to determine a lock grant with high granularity versus scalability of having that high granularity. For example, being able to lock a single offset on an object will be high granularity. If a program wishes to write a byte to a file, only that particular byte may have to be locked.

The release lock module 440 further ensures that the transaction proceeds atomically with respect to all other concurrent accesses on that one byte while at the same time not rendering the access slow or useless. In one embodiment of the present invention, the release lock module 440 use the set of related span locks and the span to be released to determine locks being released by a particular program. Upon completion of an access to an object or portions thereof, the release lock module 440 releases the lock on that particular byte for other programs to access. In one embodiment of the present invention, each program is responsible for ensuring that lock set specific functions cannot be invoked during a lock release.

Figure 5:
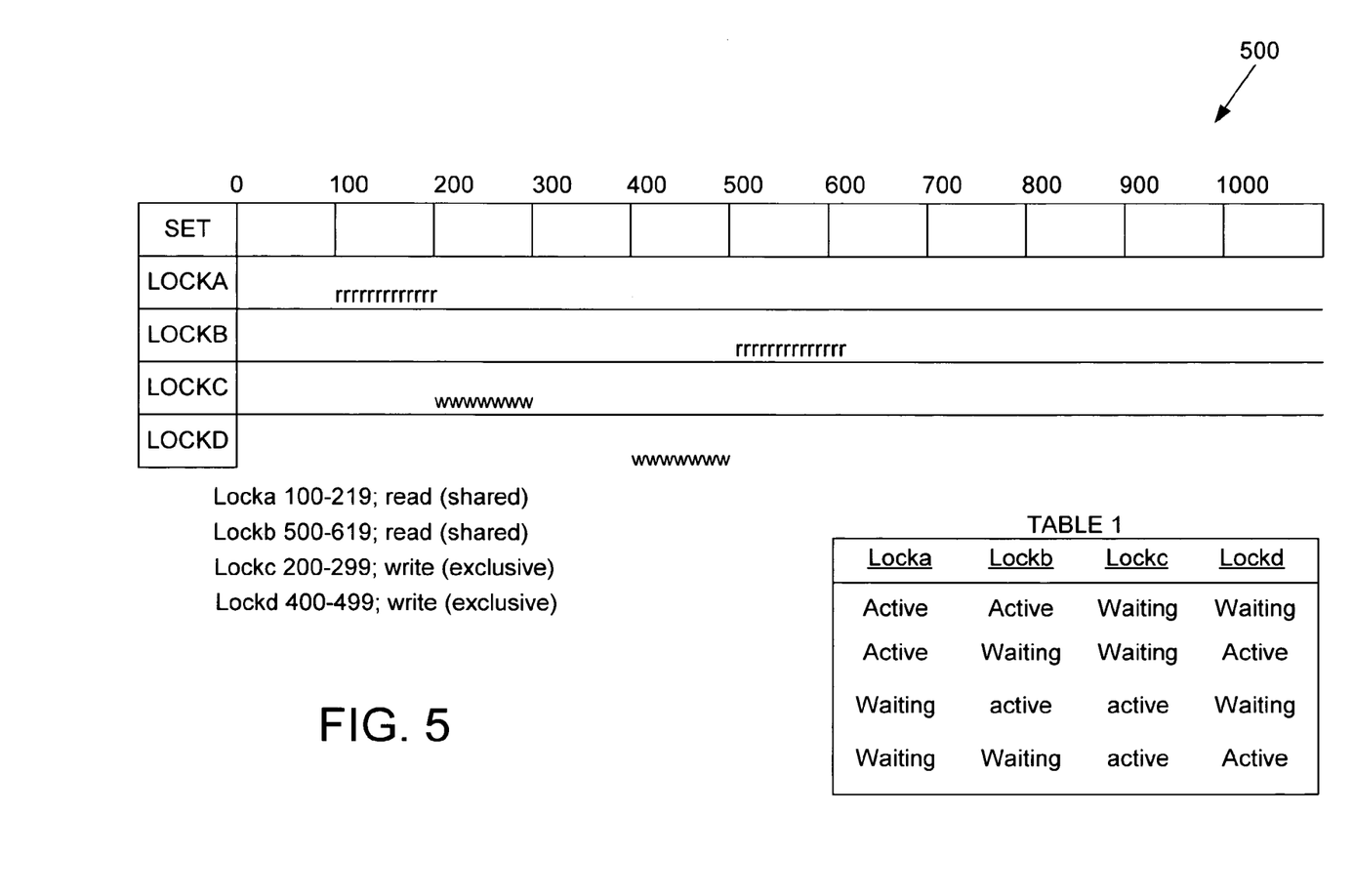
FIG. 5 is a block diagram of one embodiment an internal architecture of a file system interval locking system of an embodiment of the kernel file-system interface of the present invention.

Reference is now made to FIG. 5 which is a block diagram illustration of one embodiment of an exemplary file locking scheme of one embodiment of the present invention. As shown in FIG. 5, the locking scheme comprises a file 500 having offsets 0–1000. The locking scheme also includes a set of four range locks A–D with each lock specifying the type of operation (e.g., read or write) and the type of file locking designation (e.g., shared or exclusive). In the example shown in FIG. 5, locka controls read operations in file 600 at offsets 100–219 and is a shared lock. Lockb controls read operations to offset 500–619 in file 500 and is also a shared lock. Lockc controls write operations to offset 200–299 in file 500 and is exclusive while lockd controls write operations to offset and is exclusive. Given the above configuration, one of the following is true as shown in Table 1.

The locks locka and lockb are independent as are lockc and lockd. There is no relationship between (locka or lockb) and (lockc and lockd). In one embodiment of the present invention, the file lock system 330 comprises a set of active locks on a file 500. The set of active locks is an opaque structure generated by a constructor in the file lock system 330. Once constructed, it can manage locks of a public type. These locks express a range of values which are checked by a file lock allocation mechanism in the file lock system 330 against existing locks in the file system 260.

If there are no intersecting ranges, or the intersecting ranges are not conflicting (shared versus exclusive), the lock is granted. If not, the file lock allocation mechanism blocks with the lock pending until this condition is met. In one embodiment of the present invention, there is an option to return an error rather than block the allocation of the lock. 400–499 and in memory descriptor system 370 of the present invention.

Figure 6:
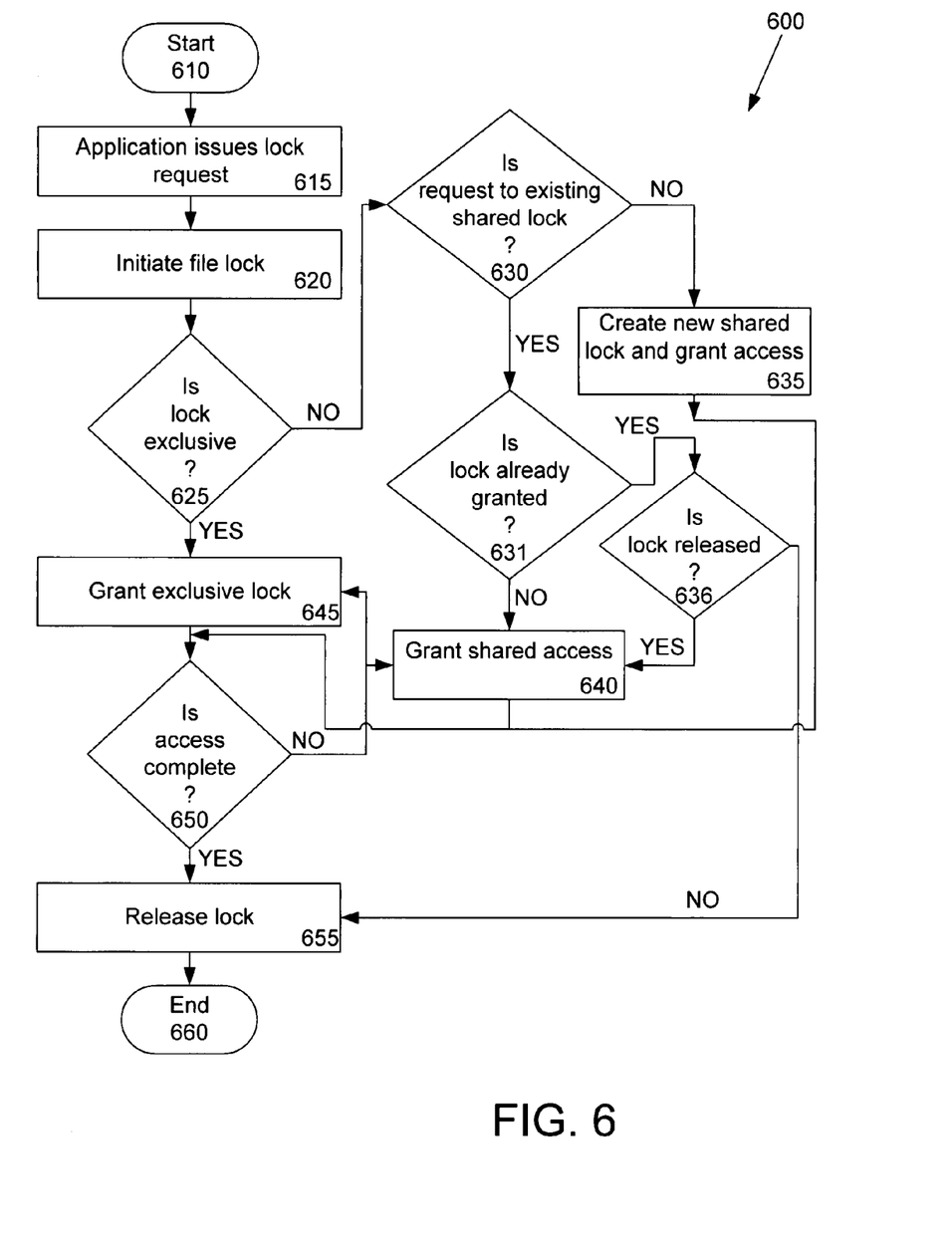
FIG. 6 is a flow diagram of one embodiment of a generating file interval locks in a file system of one embodiment of the present invention.

Reference is now made to FIG. 6 which is an exemplary computer implemented flow diagram of one embodiment of a file locking generation interface environment 600 of the present invention. As shown in FIG. 6, application programs issue sets of generic requests at step 615 by making appropriate system calls (e.g., read, write, etc.) to the kernel 240 which allows the underlying file system 260 to allow a specified file or file offsets to be locked in place for the generation of locks to the requested offset location.

At step 620, the file lock generation interface 330 initiates a lock generation logic to construct locks to represent the address where the application wishes to access in a file object. At step 625 the file lock generation logic determines whether the requested access and the corresponding lock generated is exclusive. If the lock is exclusive, the file lock generation system 330 generates an exclusive lock to the requesting application at step 645.

If the requesting application is requesting access to a file object that is not exclusive, the file lock generation interface 330 determines whether the requested access is to an already existing shared lock at step 630. In determining whether the lock is already existing, the system also checks at decision steps 631 and 636 to see if a lock being granted is conflicted or not (i.e., whether lock has been granted and not released, thus blocking the state of the lock). If the file access request is to an existing shared lock, the file lock generation interface 330 grants access to the particular shared lock to the requesting application at step 640. If a file access request in non-exclusive and not to an already existing shared lock, a new shared lock is granted to the requesting application at step 635.

At step 650 the file lock generation interface 330 determines whether any of the accesses granted at steps 635, 640 and 645 are complete. If either one of these access steps is complete, the corresponding application releases the granted lock to enable other applications access to the particular lock and processing ends at step 660.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system, comprising:
   an operating system;
   a kernel defined within the operating system;
   a file system interface defined within the kernel; and
   a file interval lock interface module (FILIM) defined within the file system interface, the FILIM defined to control access to a file object represented as a directly addressable sequence of bytes, such that simultaneous accesses to non-overlapping intervals within the file object are allowed, and simultaneous accesses to overlapping intervals within the file object are subject to a locking protocol, wherein each interval is defined by a starting byte location and a byte length within the file object.

2. The computer system of claim 1, wherein the FILIM is defined to permit concurrent accesses to non-overlapping intervals within the file object, wherein the concurrent accesses can be either read accesses, write accesses, or a combination of both read and write accesses.

3. The computer system of claim 1, wherein the locking protocol is defined as a shared access protocol when only simultaneous read accesses are directed to the overlapping intervals.

4. The computer system of claim 1, wherein the locking protocol is defined as an exclusive access protocol when a write access is directed to either of the overlapping intervals.

5. The computer system of claim 1, wherein the FILIM synchronizes access to files in a file system.

6. A computer implemented file system lock generation interface method, said method comprising:
   providing access to a computer system file system; and
   providing a file interval lock generation system to generate a plurality of interval locks for providing simultaneous access to a file object in said file system, wherein the file object represents as a directly addressable sequence of bytes, wherein the file interval lock generation system functions to allow simultaneous accesses to non-overlapping intervals within the file object, and subject simultaneous accesses to overlapping intervals within the file object to a locking protocol, wherein each interval is defined by a starting byte location and a byte length within the file object.

7. A method as described in claim 6, wherein the file interval lock generation system is defined to permit concurrent accesses to non-overlapping intervals within the file object, wherein the concurrent accesses can be either read accesses, write accesses, or a combination of both read and write accesses.

8. A method as described in claim 6, wherein the locking protocol is defined as a shared access protocol when only simultaneous read accesses are directed to the overlapping intervals.

9. A method as described in claim 6, wherein the locking protocol is defined as an exclusive access protocol when a write access is directed to either of the overlapping intervals.

10. A method as described in claim 6, wherein the file interval lock generation system synchronizes access to files in said file system.

* * * * *